US007836233B2

(12) United States Patent
Tsunedomi et al.

(10) Patent No.: US 7,836,233 B2
(45) Date of Patent: Nov. 16, 2010

(54) MULTI-PROCESSOR SYSTEM

(75) Inventors: Kunihiko Tsunedomi, Hitachi (JP);
Kentaro Yoshimura, Hitachi (JP);
Nobuyasu Kanekawa, Hitachi (JP);
Takanori Yokoyama, Hitachi (JP);
Mitsuru Watabe, Naka (JP)

(73) Assignee: Hitachi, Ltd., Tokyo (JP)

( * ) Notice: Subject to any disclaimer, the term of this patent is extended or adjusted under 35 U.S.C. 154(b) by 2219 days.

(21) Appl. No.: 10/642,755

(22) Filed: Aug. 19, 2003

(65) Prior Publication Data

US 2004/0176857 A1 Sep. 9, 2004

(30) Foreign Application Priority Data

Mar. 5, 2003 (JP) ............................. 2003-059060

(51) Int. Cl.
*G06F 13/00* (2006.01)
(52) U.S. Cl. .......................................... 710/110; 700/3
(58) Field of Classification Search .................. 710/110; 700/3
See application file for complete search history.

(56) References Cited

U.S. PATENT DOCUMENTS

| | | | | | |
|---|---|---|---|---|---|
| 4,739,323 | A | * | 4/1988 | Miesterfeld et al. | ......... 370/447 |
| 5,737,630 | A | * | 4/1998 | Kobayashi | .................... 712/29 |
| 5,878,234 | A | * | 3/1999 | Dutkiewicz et al. | ......... 710/110 |
| 7,020,790 | B2 | * | 3/2006 | Mares | ......................... 713/340 |
| 2002/0120795 | A1 | * | 8/2002 | Charlier | ...................... 710/33 |
| 2004/0039866 | A1 | * | 2/2004 | Cheung | ...................... 710/305 |
| 2009/0024776 | A1 | * | 1/2009 | Cheung et al. | .............. 710/110 |

FOREIGN PATENT DOCUMENTS

JP 09293047 11/1997

* cited by examiner

*Primary Examiner*—Glenn A Auve
(74) *Attorney, Agent, or Firm*—Brundidge & Stanger, P.C.

(57) ABSTRACT

A serial communication interface (SCI) cable 4 is provided between the slave processor 2 and the master processor 3. Both processors are connected with a communication interface for peripheral units (SPI: Serial Peripheral Interface) which enables fast transmission. The slave processor 2 transmits a transmission request command which requests at least one of data transmission and reception from the command communication section 220 to the master processor 3 through the SCI cable 4. The master processor 3 transfers data to and from the slave processor 2 in communication with the slave processor 2 by means of the data communication section 310 through the fast SPI cable 5 in response to a transmission request command sent from the slave processor 2

With this, the processing ability of a multi-processor system can be increased.

11 Claims, 10 Drawing Sheets

SCI CMD : SCI COMMAND
Seq. : SEQUENTIAL BIT

|   | SERVICE ID OR RESPONSE ID | COMMAND ID | COMMAND NAME | ARGUMENT |
|---|---|---|---|---|
| (1) | 0x0 (INPUT) | 0x0 | XMIT_IN | bit1 TO bit7 : PAGE ID<br>bit0 : END FLAG |
| (2) | 0x1 (OUTPUT) | 0x0 | RECV_OUT | END FLAG |
| (3) | 0x2 (SHARED MEMORY) | 0x0 | SYNC_PAGE | PAGE ID |
|   |   | 0x1 | READ_PAGE | NONE |
| (4) | 0x7 (RESPONSE) | 0x0 | ACK | RETURN CODE |
|   |   | 0x1 | NAK | ERROR CODE |

MULTI-PROCESSOR SYSTEM

BACKGROUND OF THE INVENTION

1. Field of the Invention

This invention relates to technology on communication between processors in a multi-processor system.

2. Prior Art

In some cases, controllers for controlling automobiles may adopt a multi-processor system for improvement of their processing ability. Judging from improvement of cost performance, a conventional multi-processor system has a plurality of processors which are connected each other by their built-in serial communication interfaces (SCI: Serial Communication Interface). The transmission speed of the SCI is about 500K to 1M bits per second (maximum) depending upon kinds of processors.

In the meantime, a communication interface for peripheral units (SPI: Serial Peripheral Interface) has been well known as a faster serial communication interface than the SCI. The SPI can transfer data at about 4M to 10M bits per second (maximum) depending upon kinds of processors. However, this interface is a single master type full duplex bi-directional communication interface for peripheral units and can let only one transmission-starting master exist on the serial line.

For example, Japanese Application Patent Laid-Open Publication No. Hei 09-293047 discloses an SPI system which uses SCI and SPI cables to connect microcomputers and external devices which monitors memory data of the microcomputers. In this system, the external units use the SCI cables to send high-order addresses of memory data to the microcomputers. The external units use the SPI cables to send low-order addresses of memory data to the microcomputers and to receive memory data from the microcomputers.

SUMMARY OF THE INVENTION

Recently, multi-processor systems are expected to have higher processing abilities. For example, as electric automobiles, hybrid automobiles, and engines using electro-magnetically driven valves have gained in popularity, the multi-processor systems for controlling them have had more items to be controlled and more sensors to be installed. Further, the multi-processor systems have been forced to quicken the transmission speed between processors.

An object of this invention is to increase the processing ability of a multi-processor system.

In an aspect, this invention is characterized by a multi-processor system comprising:

a slave processor;

a first transmission path connected to said slave processor;

a master processor connected to said first transmission path through which said master processor starts to communicate with said slave processor; and a second transmission path which connects said slave processor and said master processor and whose transmission speed is smaller than that of said first transmission path; wherein said slave processor is equipped with a command transmission means for sending a transmission request command which requests said master processor at least either to transmit or to receive data to said master processor via said second transmission path; and said master processor is equipped with a data transmission means for starting data transmission to said slave processor via said first transmission path in response to said transmission request command.

DETAILED DESCRIPTION OF THE INVENTION

Preferred embodiments of the present invention are described below with reference to the accompanying drawings.

Figure 1:
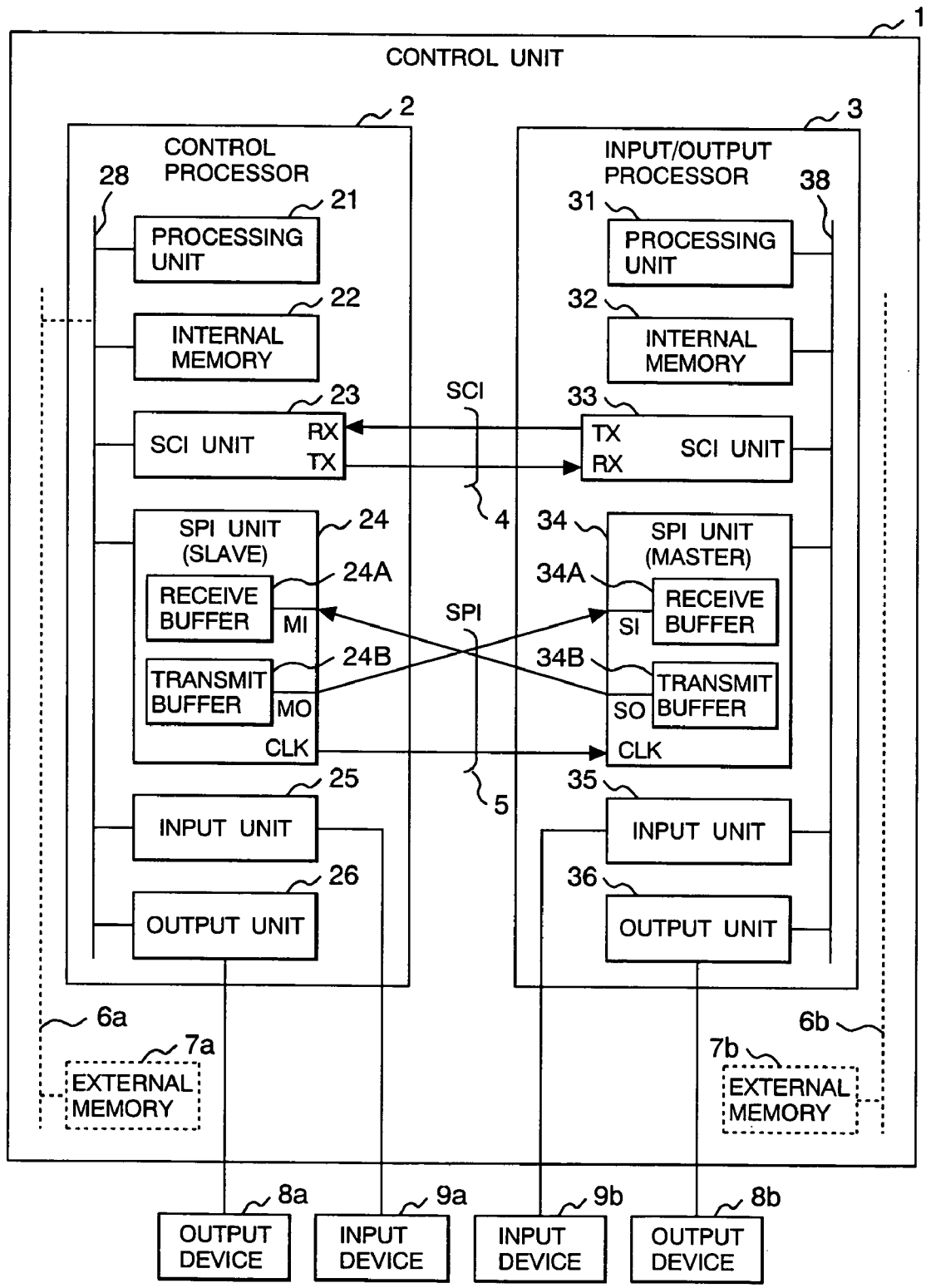
FIG. 1 shows a hardware configuration of a multi-processor system which is an embodiment of the present invention.

Referring to FIG. 1, below will be described the hardware configuration of a multi-processor system which is an embodiment of the present invention, taking a system in a control unit for automobile control as an example of multi-processor system.

The control unit 1 in accordance with this embodiment comprises two processors 2 and 3 which are connected with two communication cables 4 and 5 whose transmission speeds are different.

One 4 of the two communication cables 4 and 5 is an SCI cable containing two signal lines and the other cable 5 is an SPI cable containing three signal lines. One of the two signal lines of the SCI cable 4 connects the TX port of the SCI unit (to be hereinafter described) in one 2 of the processors and the RX port of the SCI unit in the other processor 3. The other signal line of the SCI cable 4 connects the RX port of the SCI unit of the processor 2 and the TX port of the SCI unit of the processor 3. One of three signal lines of the SPI cable 5 connects CLK ports of the SPI units (to be hereinafter described) in the processors 2 and 3. One of the remaining two signal lines of the SPI cable 5 connects the MI port of the SPI unit of the processor 2 and the SO port of the SPI unit of the processor 3. The last signal line of the SPI cable 5 connects the MO port of the SPI unit of the processor 2 and the SI port of the SPI unit of the processor.

Further, each processors 2 (3) comprises internal memory 22 (32) (RAM, ROM, EEPROM, flash memory, etc.) which stores various kinds of data such as programs that define operations related to control of automobiles, an processing unit 21 (31) which fetches instructions from the internal memory 22 (32) and executes them, an SCI unit 23 (33) which connects the SCI cable 4 and implements clock-synchronization or start-stop full-duplex serial communications, an SPI unit 24 (34) which connects the SPI cable 5 and implements clock-synchronization full-duplex serial communications, an output unit (e.g., I/O port or AD converter) 26 (36) which sends data to one or more output devices (e.g., actuator, or relay) 8*a* (8*b*) to be controlled an input unit (e.g., I/O port or AD converter) 25 (35) which receives data output from one or more input devices (e.g., sensors) 9*a* (9*b*) which detects information related to the status of a device to be controlled, and an internal bus 28 (38) which connects these units.

Although the example of system configuration in FIG. 1 connects input devices 9*a* and 9*b* and output devices 8*a* and 8*b* to the input units 25 and 26 and the output units 26 and 36 of both processors 2 and 3, the input and output devices can be connected to the input and output units of either of the processors.

The SCI units 23 and 33 are multi-master type communication interface units by which any of the two processors 2 and 3 can start communication (hereinafter described as SCI transmission). The SCI is basically a 1-byte digital input/output. When a transmit/receive buffer of, for example, about 8 bytes long is provided in the SCI unit, data of some bytes can be transferred continuously.

Each of the SPI units 24 (34) is a single master type communication interface unit by which one processor (processor 3 in this embodiment) defined as a master processor can start communication (hereinafter described as SPI transmission) with the other processor (slave processor). Each of these SPI units 24 and 34 is equipped with a receive buffer 24A (34A) of some ten bytes long to hold data transferred from the other SPI unit via the SPI cable 5 and a transmit buffer 24B (34B) of some ten bytes long to hold data transferred to the other SPI unit via the SPI cable 5. When the master processor 3 specifies a destination slave processor 2 by a CS (Chip Select) signal, data is transferred from inside the transmit buffer 34B in the SPI unit 34 (master) of the master processor 3 to the receive buffer 24A of the SPI unit (slave) of the slave processor 2 and simultaneously from inside the transmit buffer 24B of the slave to the receive buffer 34A of the master.

The above-described hardware configuration is only a reference example and can be modified properly if necessary. For example, when the internal memory is not enough or when the internal memory is flash memory which is not rewritten frequently, it is preferable to connect external memory (RAM, flash memory, etc.) 7*a* and 7*b* to the processors 2 and 3 by means of external buses 6*a* and 6*b* to increase the size of the internal memory or the rewriting number as indicated by the dashed line in FIG. 1. Although each processor 2 or 3 in the configuration of FIG. 1 houses the SCI unit and the SPI unit, the processor can have them outside the processor if the processor is comparatively small and less functional.

With such a hardware configuration, a multi-processor system can accomplish both a functional distributed system which distributes automobile controlling functions to two processors 2 and 3 and a load balancing system which distributes automobile-controlling loads to two processors 2 and 3. Let's assume a functional distributing multi-processor system which is accomplished by connecting an input device and an output device to the input unit 35 and the output unit 36 of the I/O processor 3, assigning output device controlling processing (a control program) to the slave processor (hereinafter termed as a control processor), and assigning processing (an application program) to judge the result of operation by the I/O processing (input/output driver) on respective external devices (input and output devices) and the control program on the control processor to the master processor (hereinafter termed as a control processor). Here we take this multi-processor system as an example to explain the configuration of buffer areas and software of memories 22 and 23 built in two processors 2 and 3.

Figure 2:
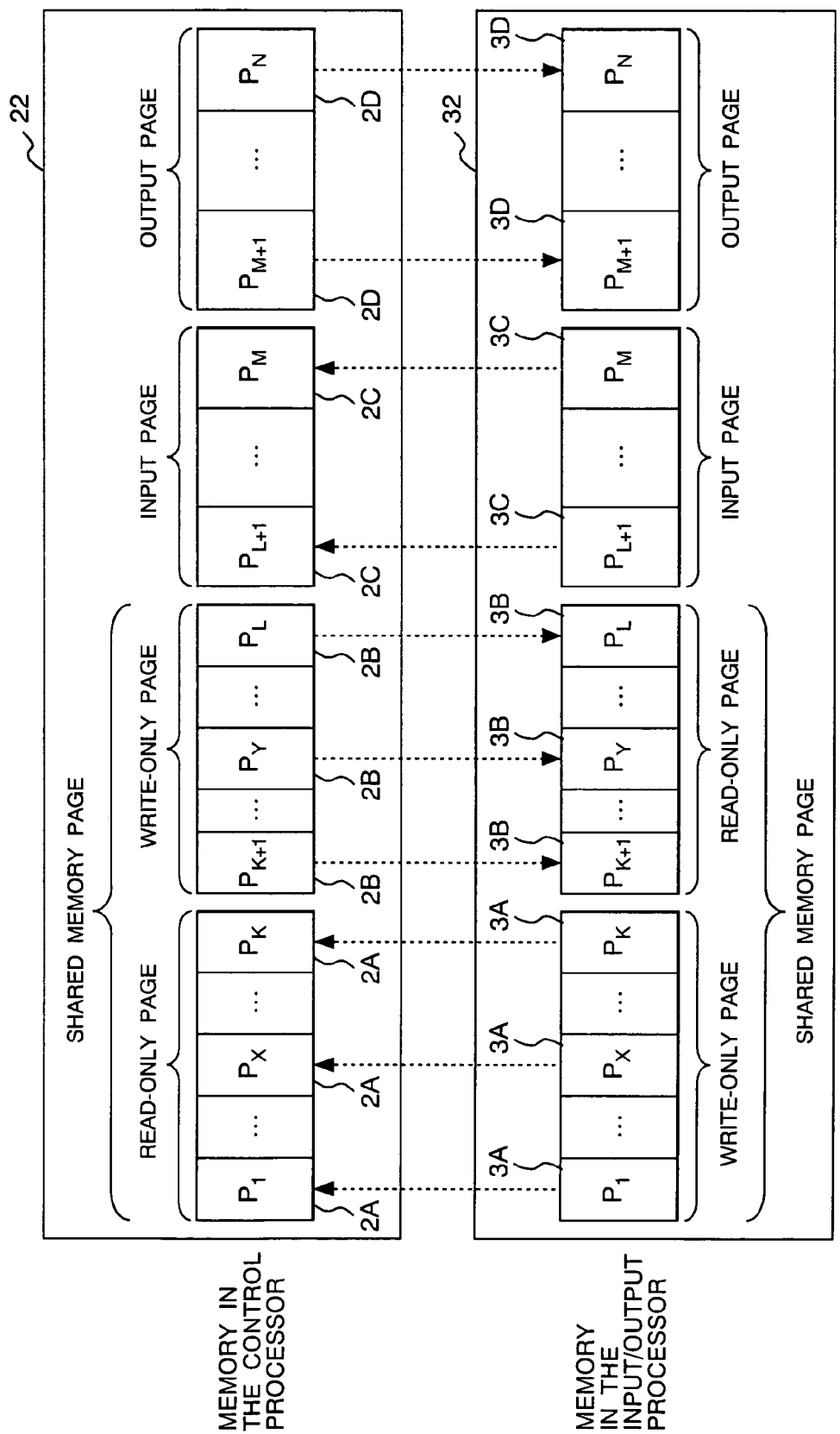
FIG. 2 shows a conceptual page configuration of buffers in two processors of a multi-processor system which is an embodiment of the present invention.

The storage areas of memories 22 and 23 built in two processors 2 and 3 (or external memories 6 and 7 when external memories are installed) respectively contain buffer areas for storing data transferred to and from the relevant processor via the SPI unit. As shown in FIG. 2, these buffer areas are controlled in pages which are fixed storage areas of fixed lengths. Each page is assigned a page number $P_1, \ldots PN$ as a page ID.

The memory of the input/output processor 3 contains a group of input pages 3C and a group of output page 3D. The memory of the control processor 2 contains a group of input pages 2C whose numbers are the same as those of the input pages 3C and a group of output page 2D whose numbers are the same as those of the output pages 3D. The input/output driver stores data output from a relevant input device in input pages 3C of the input/output processor 3. The data of the input pages 3C is copied onto input pages 2C of the control processor 2 with their page numbers matched. The control program stores data input to the corresponding output devices in the corresponding output pages 2D of the control processor 2. The data of the output pages 2D is copied onto output pages 3D of the input/output processor 3 with their page numbers matched. Therefore, the control program on the control processor 2 can get the output data of the input device of the input/output processor 2 by reading data from the input pages 2C of the control processor 2. The input/output driver on the input/output processor 3 can get the output of the control program (data input to the output device) on the control processor 2 by reading data from the output pages 3D of the input/output processor 3.

The memory of the input/output processor 3 also contains a group of shared memory pages comprising a plurality of write-only pages 3A and a plurality of read-only pages 3B. The memory of the control processor 2 also contains a group of shared memory pages comprising a plurality of write-only page 2B which are numbered in the same manner as the read-only pages 3B of the input/output processor 3 and a plurality of read-only page 2A which are numbered in the same manner as the write-only pages 3A pages of the input/output processor 3.

The write-only pages 3A of the input/output processor 3 respectively store outputs of the corresponding application programs and data of the write-only pages 3A is copied onto the read-only pages 2A of the control processor 2 with their page numbers matched. Further, the write-only pages 2B of the control processor 2 stores the output of the corresponding control programs and data of the write-only pages 2B are copied onto the read-only pages 3B of the input/output processor 3 with their page numbers matched. Therefore, the control program on the control processor 2 can get the output data of the application program of the input/output processor 2 by reading data from the read-only pages 2A of the control processor 2. The application program on the input/output processor 3 can get the output of the control program on the control processor 2 by reading data from the read-only pages 3B of the input/output processor 3.

The communication data to be transferred via the SPI unit comprises various fields such as page data storage fields $D_1$ which store data to be set in pages, a page number storage field $D_2$, a pad storage field $D_3$ (not used in this embodiment), a checksum storage field $D_4$, and a storage field $D_5$ for storing 1's complement of the checksum. Therefore, the page size for the data is made smaller by 4 bytes than the size of the receiver buffer and the size of the transmit buffer in the SPI units 24 and 34. Without these storage fields $D_2$ to $D_5$ in communication data, the page size can be equal to the size of the receiver buffer and the size of the transmit buffer in the SPI units 24 and 34.

Figure 4:
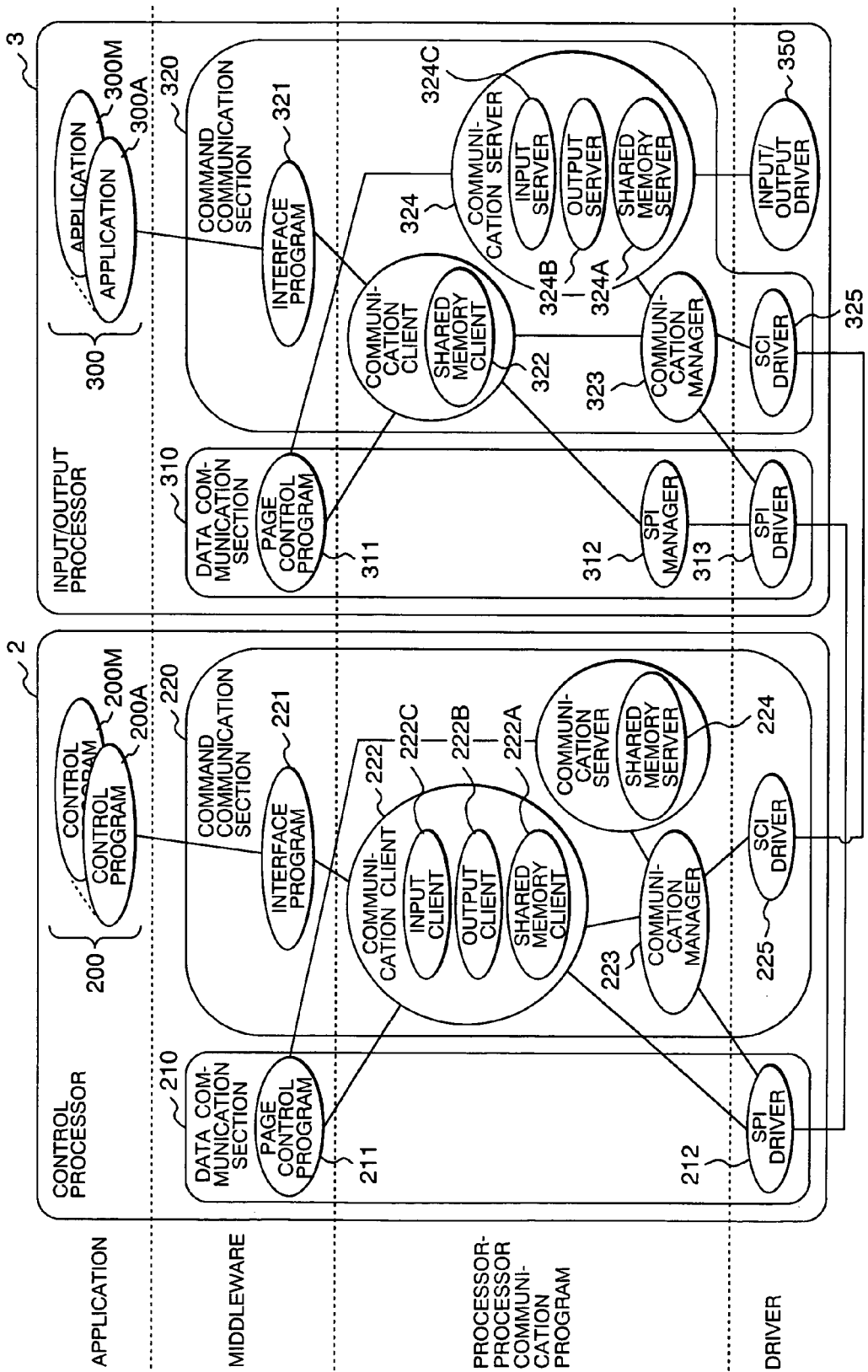
FIG. 4 shows a software configuration of a multi-processor system which is an embodiment of the present invention.

FIG. 4 shows the software configuration of the two processors 2 and 3.

Software stored in the internal memory 22 of the control processor 2 comprises control programs 200A to 200M prepared for respective output-device control processing (engine control, torque control, power-train related control, body control, additional battery control for hybrid and electric automobiles, etc.), a group of programs for accomplishing a command communication section 220 for SCI transmission, and a group of programs for accomplishing a data communication section 210 for SPI transmission. These programs are explained in detail below.

Each of the control programs 200A to 200M can execute control processing with data to be input to the corresponding input device 9a or 9b, and create control data with which the corresponding output device 8a or 8b will be controlled. In other words, each control program can get data to be input to the input device 9b which belongs to the master processor 3 from the input/output processor 3 (master processor) by a function provided by the command communication section 220. Similarly, the control program can output control data to the corresponding output device 8b which belongs to the master processor 3 from the input/output processor 3. This function will be explained in detail below.

The major programs in the command communication section 220 are a group of communication clients which create commands for the input/output processor 3 in response to requests from the control programs 200A to 200M, an interface program 221 which interfaces communication clients with control programs 200A to 200M, a communication manager 223 which controls SCI transmission, a communication server (shared memory server) 224 which executes commands sent from the input/output processor 3, and an SCI driver 225 which controls the SCI unit 23.

Figures 5, 6:
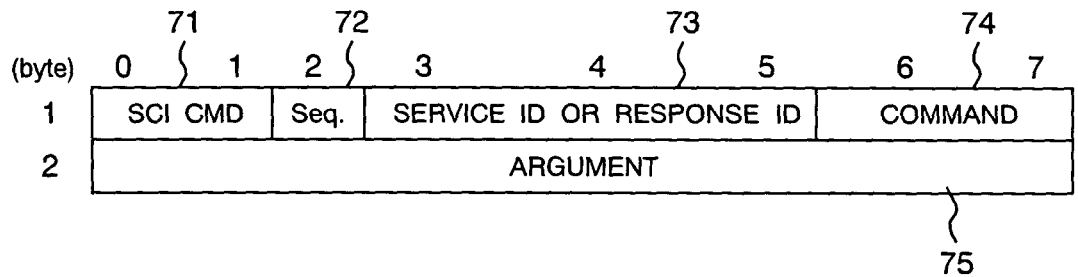
FIG. 5 shows a conceptual format of a command message.
FIG. 6 shows examples of data which can be set in a command message.

The group of communication clients comprises an output client 222B which creates a reception request command (RECV_OUT) which requests the input/output processor 3 to receive data of output pages 2D, an input client 222C which creates a transmission request command (XMIT_IN) which requests the input/output processor 3 to transmit data of input pages 3C, and a shared memory client 222A which creates a transmission/reception request command (SYNC_PAGE) which requests the input/output processor 3 to exchange data of the write-only pages 2B and 3A. A command message is used to transmit commands created by the communication clients 222A to 222C to the input/output processor 3. As shown in FIG. 5, the command message is formatted to have a SCI command field 71 which requests to establish or break an SCI connection, a sequential bit data field 72 of one bit or longer used for identification of a command message, a service ID field 73 for a service which is provided in response to a command created by a communication client, a command ID field 74 for a command which is created by a communication client (a command name and a command ID assigned to each service), and a command argument field 75 of a command created by a communication client. FIG. 6 (1) to (3) shows examples of service IDs, command names, command IDs, and arguments to be set in command messages.

The interface program 221 contains functions below to call communication clients 222A to 222C in response to requests made by the control programs 200A to 200M.

(A) input_sync(top, num)
First argument "top": Top receiving page number
Second argument "num": Number of pages to be received
This input function provides interface to read data of input pages 3C in the input/output processor 3 for a group of control programs 200 in the control processor 2. Substantially, this function calls an input client 222C to transfer data of the specified number of input pages 3C (equivalent to the second argument "num") beginning with the input page 3C specified by the first argument "top" to the input pages 2C of the same page numbers.

(B) output_sync(top, num)
First argument "top": Top transmitted page number
Second argument "num": Number of pages to be transmitted
This output function provides interface to write data in the output pages 3D in the input/output processor 3 for a group of control programs 200 in the control processor 2. Substantially, this function calls an output client 222B to transfer data of the specified number of output pages 2D (equivalent to the second argument "num") beginning with the output page 2D specified by the first argument "top" to the output pages 3D of the same page numbers.

(C) read_write_sync(r_page, w_page)
First argument "r_page": Received page number
Second argument "w_page": Transmitted page number
This shared memory function provides interface to switch between data of the write-only pages 2B in the control processor 2 and data of the write-only pages 3A in the input/output processor 3 for a group of control programs 200 in the control processor 2 and a group of application programs in the input/output processor 3.

Substantially, this function calls a shared memory client 222A to transfer data from the write-only pages 2B specified by the second argument "w_page" to the read-only pages 3B of the same page numbers and to transfer data from the write-only pages 3A specified by the first argument "r_page" to the read-only pages 2A of the same page numbers.

The shared memory server 224 selects a transmission/reception request command (SYNC_PAGE) and a read request command (READ_PAGE) (to be described later), interprets and executes them, and generates their response commands (ACK representing the command was executed successfully and NAK representing the command ended abnormally) as the results of execution of the commands. The format of a response message to transmit this response command to the input/output processor 3 is the same as that of the command message (see FIG. 5) created by the communication client excepting that that data field 75 stores a response ID indicating this is a response to a command instead of a service ID. Example data set in a response message (response ID, command name, command ID, and argument) is shown by item (4) of FIG. 6.

The communication manager 223 requests the SCI driver 225 to transmit the messages which are created by the communication clients 222A to 222C and the communication server 224, and transfers a message which the SCI driver 225 received from the input/output processor 3 to the communication server 224 or a communication client which submitted a command. Further, the communication manager 223 manages client-using rights and server-using rights to hold the service ID of a service 223 which uses the communication manager 223 so that a plurality of services may not use the communication manager 223 at the same time. As this prevents simultaneous and competitive use of the communication manager 223, the command buffer of the communication manager 223 can be for example one command wide. This can make the communication manager 223 simpler. Further, as the communication manager 223 can identify, by referencing client-using rights, a destination client to which the input/output processor 3 transmits a response message among communication clients 222A to 222C, the response message need not contain a service ID as already described above. This can reduce the overhead in the slow SCI transmission.

The SCI driver 225 implements initialization processing (interrupt setting, baud rate setting of the SCI unit 23, etc.), transmission processing for transmitting messages from the communication manager 223 through the SCI unit, and reception processing for receiving messages through the SCI unit 23 and transferring them to the communication manager 223. The SCI driver 225 executes a message retransmission when detecting an SCI level error (parity error or framing error) in the transmission processing and discards received packets when detecting an SCI level error in the reception processing. Further, if necessary, the SCI driver 225 informs the communication manager, the control program, and so on of the error type.

The software in the data communication section 210 contains a page management program 211 and an SPI driver 212 to control the SPI unit 24.

In response to external requests from the communication clients 222A to 222C and the shared memory server 224, the page management program 211 transfers data in pages from output pages 2D or write-only pages 2B to the transmit buffer 24B of the SPI unit 24 or from the receive buffer 24A of the SPI unit 24 to the input page 2C or the read-only pages 2A.

The SPI driver 212 implements initialization of the SPI unit 24 (slave mode setting and "Disabled" setting after the end of SPI transmission) and start of transmission/reception for enabling the SPI unit in response to a request from a communication client just before transmission of a command message. Further, to detect a garbled message in transmission/reception, the SPI driver 212 calculates a checksum of the transmit buffer 24B in the SPI unit 24 before transmission, writes the checksum and the 1's complement of the checksum in the command message, calculates a checksum of the receive buffer 24A of the SPI unit 24 after reception, and checks whether the checksum and the 1's complement are right. In this embodiment, however, "Inhibiting an interrupt ("Disabled") after the end of SPI transmission" is set in the initialization processing to inform the end of the SPI transmission by a response message. To generate an interrupt at the end of an SPI transmission instead of a response message, "Enabled" should be set in the initialization processing.

The software in the internal memory 32 of the input/output processor 3 contains application programs 300A to 300M prepared in correspondence with control programs in the control processor 2, a group of programs to accomplish the command communication section 320 for SCI transmission, a group of programs to accomplish the data communication section 310 for SPI transmission, and an input/output driver 350 to fetch output data of the input device 9b and execute data input to the output device 8b. The functions of these programs are outlined below except those whose names are also found in the software of the control processor 3.

Application programs 300A to 300M respectively implement similar processing to that of control programs 200A to 200M in the control processor 2 to judge the results of operations of control programs 200A to 200M in the control processor 2 and compares the operational results of the application programs 300A to 300M to those of the control programs 200A to 200M. These application programs respectively exchange data with control programs in the control processor 2 to judge the operational result of respective control programs in the control processor 2.

The program groups in the command communication section 320 comprise a communication client (a shared memory client) 322 which generates commands in response to requests from the application programs 300A to 300M, an interface program 321 which interfaces a group of application programs 300 to the shared memory client 322, a communication manager 323 which controls the SCI transmission which is functionally similar to the communication manager of the control processor 2, a group of communication servers 324 which provides services for commands sent from the control processor 2, and an SCI driver 325 which controls the SCI unit 33 by a processing similar to that of the SCI driver 225 of the control processor 2.

The communication client contains at least a shared memory client 322. The shared memory client 322 creates a transmission/reception request command (SYNC_PAGE) which requests the control processor 2 to exchange data between write-only pages 2B and 3A and another transmission/reception request command (SYNC_PAGE) which requests the control processor 2 to read data from the receive buffer 24A.

The interface program 321 contains at least a shared memory function (read_write_sync) which is functionally the same as the shared memory function (read write_sync) in the interface program 222 of the control processor 2.

The program group of the data communication section 310 comprises a page manager program 311 which processes in the same manner as the page manager program 211 of the control processor 2, an SPI manager 312, and an SPI driver 313 which controls the SPI unit 24.

The SPI manager 312 manages the SPI-using right which records the service ID of a service which uses the SPI unit so that a plurality of services may use the SPI unit exclusively. However, this embodiment does not always require the SPI manager 312 because this embodiment can manage the server using rights so that a plurality of services may use the SPI unit exclusively.

The SPI driver 313 implements initialization of the SPI unit 34 (master mode setting and "Enable" setting after the end of an SPI transmission) and transmission/reception starting processing which starts an SPI transmission in response to an instruction from the communication server group 324. In the transmission/reception starting processing, the SPI driver 313 starts an SPI transmission by means of a register of the SPI unit 34. In the SPI transmission, the SPI unit 34 keeps on generating a CLK signal, transfers data from the transmit buffer 34B to the receive buffer 24A of the SPI unit 24 in the control processor 2 in synchronism with the CLK and data from the transmit buffer 24B of the SPI unit 24 in the control processor 2 to the receive buffer 34A. In response to an interrupt after the SPI transmission ends, the SPI driver 313 causes the communication manager 323 to call a communication server which started the communication manager 323.

The communication server group 324 contains a shared memory server 324A, an input server 324C, and an output server 324B. The shared memory server 324A selects a transmission/reception request command (SYNC_PAGE) among commands sent from the control processor 2, interprets and executes the command, and creates a response command (ACK or NAK) which represents the result of the execution. The input server 324C selects a transmission request command (XMIT_IN) among commands sent from the control processor 2, interprets and executes the command, and creates a response command (ACK or NAK) which represents the result of the execution. The output server 324B selects a reception request command (RECV_OUT) among commands sent from the control processor 2, interprets and executes the command, and creates a response command (ACK or NAK) which represents the result of the execution. The format of a response message to transmit a response command to the control processor 2 is the same as that of the response message which is created by the shared memory server 224 of the control processor 2.

The input/output driver 350 receives data from an input device 9 and writes data in an output device 8 in response to requests from the communication servers 324A to 324C.

Further, as this embodiment has an input device 9b and an output device 8b connected only to the input unit 35 and the output unit 36 of the input/output processor 3, the interface program 321 of the input/output processor 3 does not contain the input function (input_sync) and the output function (output_sync) and the communication client of the input/output processor 3 contains neither input client nor output client. Similarly, the communication server of the control processor contains neither input server nor output server. However, when an input device 9a and an output device 8b are also connected to the input unit 25 and the output unit 26 of the control processor 2 and when the application program on the input/output processor 3 must transfer data to and from the devices 9a and 8b, the communication client of the input/output processor 3 must contain the input client and the output client. Further, the interface program 321 of the input/output processor 3 must contain the input function (input_sync) and the output function (output_sync). Similarly, the communication server of the control processor must contain the input server and the output server.

In a functional distributed system in accordance with this embodiment, control programs are installed in the control processor only as the system assigns the control processing related to output devices to the control processor only. However, it is possible, for example, one part of the control processing related to output devices is assigned to the input/output processor 3. It is also possible to assign the other processing to each processor.

Below will be explained four kinds of processing to be implemented by a multi-processor system of a software configuration below.

Figure 7:
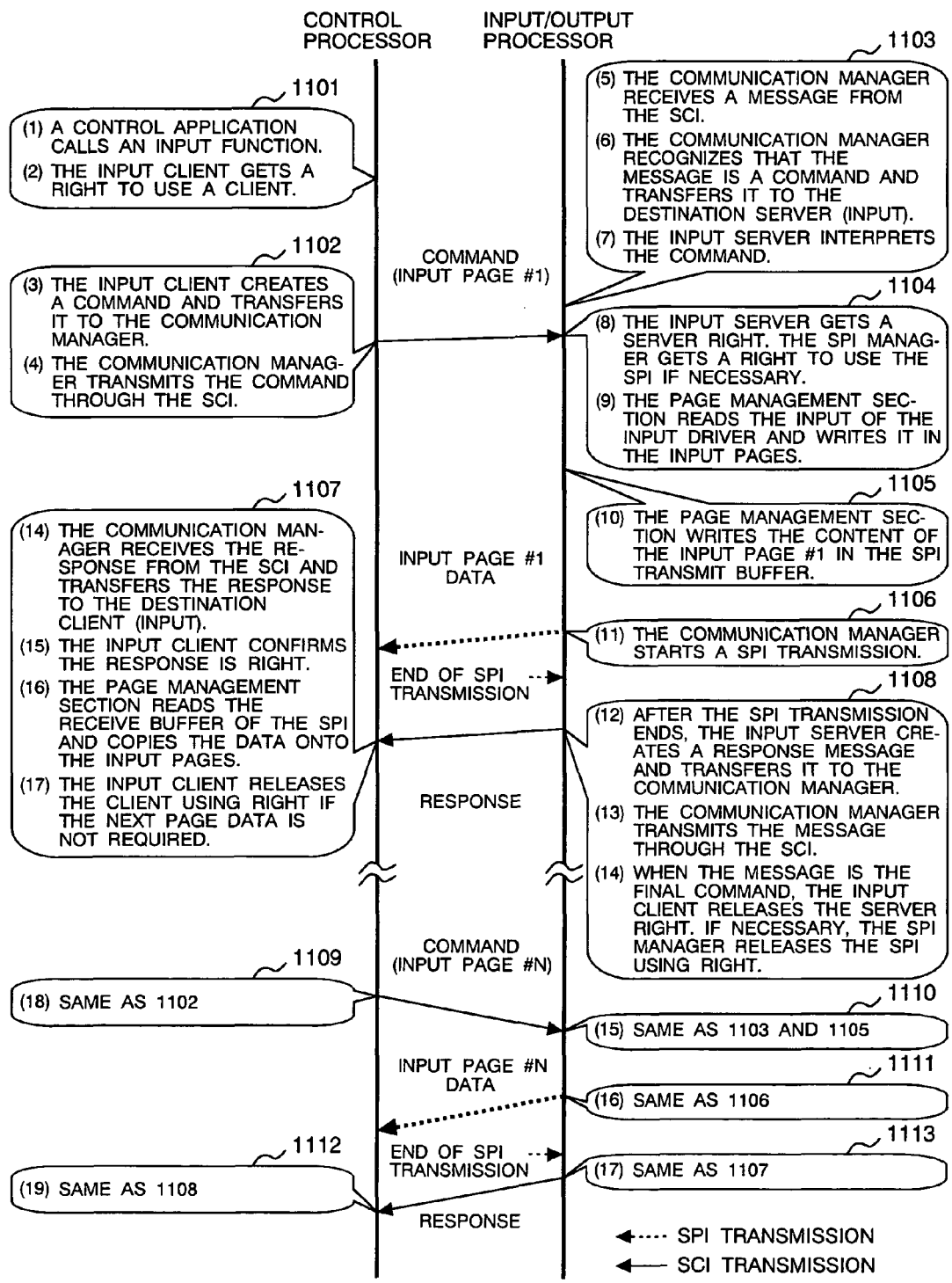
FIG. 7 is an explanatory drawing of input services of a multi-processor system which is an embodiment of the present invention.

(1) When any of the control programs 200A to 200M (control program K in this example) in the control processor 2 fetches the output of the input device 9b in the input/output processor 3, processing shown in FIG. 7 is executed. Substantially, the processing is as follows:

Step 1101:

The control program 200K calls an input function (input_sync) of the interface program 221 by specifying the top page of a series of input pages 3C which store the output of an input device assigned to the control program 200K as the first argument "top" and the number of input pages as the second argument "num." When the output of the input device assigned to the control program 200K is set in only one of the input pages 3C, the input function (input_sync) is called with the top input page number as the first argument "top" and the number of input pages "1" as the second argument "num."

Then, input client 222C called by the input function (input_sync) requests the communication manager 223 to register the service ID "0" of the input service which is requested for the input serve 324C of the input/output processor 3. With this, the service ID "0" of the input service is registered for the client-using right and the input client 222C gets the client-using right.

Step 1102:

The input client 222C creates a transmission request command message (XMIT_IN) having an argument value "1" which indicates that this transmission request command is for the final page in case the first argument "top" and the end flag "num" that are transferred when the client starts up are "1" or a transmission request command message (XMIT_IN) having an argument value "0" in case the second argument value is more than 1 and transmits the command message to the communication manager 223. When the communication manager 223 requests transmission of the transmission request command message to the SCI driver 225, the transmission request command message is transmitted to the input/output processor 3 through the SCI cable 4.

Step 1103:

When the SCI driver 325 receives a message from the control processor 2, the input/output processor 3 transfers it to the communication manager 323. When making sure that the message is a command message, the communication manager 323 transfers it to an input server 324C which is determined by a service ID set in the command message. The input server 324C interprets the command message and executes the processing below according to the result of interpretation.

Step 1104:

The input server 324C requests the communication manager 323 and the SPI manager 312 to register the service ID which is in the command message. With this, the service ID "0" of the input service which the input server 324C provides is registered to the server-using right and the SPI-using right. The input server 324C gets these server-using and SPI-using rights. Further, the input server 324C requests the page management program 311 to transfer data from the input page 3C to the SPI unit 34. A page number (source page number) set in the command message, the content of processing on the input pages (read) and a destination address (address of the transmit buffer 34B) are transferred to the page management program 311.

In response to this, the page management program 311 reads the outputs of all input devices through the input driver 350 and updates data of all input pages 3C with outputs of respective corresponding input devices.

Step 1105:

Further, the page management program 311 reads data from the source pages and writes it in a storage area of the transmit buffer 34B pointed to by a destination address.

Step 1106:

When data transfer to the transmit buffer 34B is complete, the communication manager 323 requests the SPI driver 313 to start transmission in response to an instruction from the input server 324C. With this, data of the input page 3C of the specified page number which is set as an argument in the message command, that is, the output of the input device is transmitted to the control processor 2 through the SPI cable 5.

Step 1107:

When data of one input page is normally transmitted and the input/output processor 3 generates an interrupt, the input server 324C creates a response message containing a response ID "7," the result of execution (ACK), etc. and transfers it to the communication manager 323. When the communication manager 323 requests the SCI driver 325 to transmit the response message, the SCI driver transmits the response message to the control processor 2 through the SCI cable 4.

Further, the input server 324C checks whether the end flag set as an argument in the command message has a value of "1." When the flag value is "1," the input server 324C causes the communication manager 323 and the SPI manager 312 to release the server-using right and the SPI-using right when the flag value is "1" or waits for another command message (XMIT_IN) requesting transmission of the next input page when the flag value is not "1."

Step 1108:

When the SCI driver 225 receives a message from the input/output processor 3, the control processor 2 transfers it to the communication manager 323. When the message contains a response ID "7," the communication manager 323 transfers it as a response message to the input client 222C for a service ID which is registered for a client-using right. When making sure that the response message contains ACK which represents the normal termination of the SPI transmission, the input client 222C requests the page management program 211 to transfer data from the SPI unit 24A to the input page 2C. In this case, the page management program 211 receives a page number (destination page number) which is set as an argument in the transmission request command message in Step 1102, the content of processing (write) made on the transferred page, and a source address (address of the receive buffer 24A).

Upon receiving these, the page management program 211 reads data from a storage area in the receive buffer 24A which is pointed to by the source address and writes it in the destination page. When data transfer from the receive buffer 24A is complete, the input client 222C checks whether the received data is all data in the pages specified by the second argument "num" which was transferred by the input function (input_sync) at the startup time is complete.

When all data in the pages specified by the second argument "num" is normally received, the input client 222C causes the communication manager 223 to release the client-using right.

Step 1109:

Contrarily, if all data in the pages specified by the second argument "num" is not received yet, Steps 1109 to 1113 below are executed repetitively until all data in the pages specified by the second argument "num" is normally received.

The control processor 2 implements a process like Step 1102 with the next input page number and the end flag ("1" when the next input page is the final page or "0" when the next input page is not the final page) as arguments. With this, a command message (XMIT_IN) to request transmission of the next input page is transmitted to the input/output processor 3.

Step 1110:

The input/output processor 3 implements processes like Step 1103 and 1105 according to the content of the transmission request command message.

Steps 1111 and 1113:

Further the input/output processor 3 implements processes like Step 1106 and 1107. With this, the input/output processor 3 transmits data of the input pages 3C of the page number specified by the argument of the next transmission request command message which is received at Step 1110 to the control processor 2 via the SPI cable and also transmits a response message to the control processor 2 via the SCI cable.

Step 1112:

Then, the control processor 2 implements a process like Step 1108 and writes data from the storage area of the receive buffer 24A (in the SPI unit 24) in the input page 2C of the next page number.

With processing of these steps, the control processor 2 writes data in input pages of the number of pages specified by the second argument "num" starting at an input page 3C specified by the first argument "top" set in the input function (input_sync) by the control program 200K. Therefore, the control program 200K can get the output data of the corresponding input device by reading data from these input pages 3C.

Figure 8:
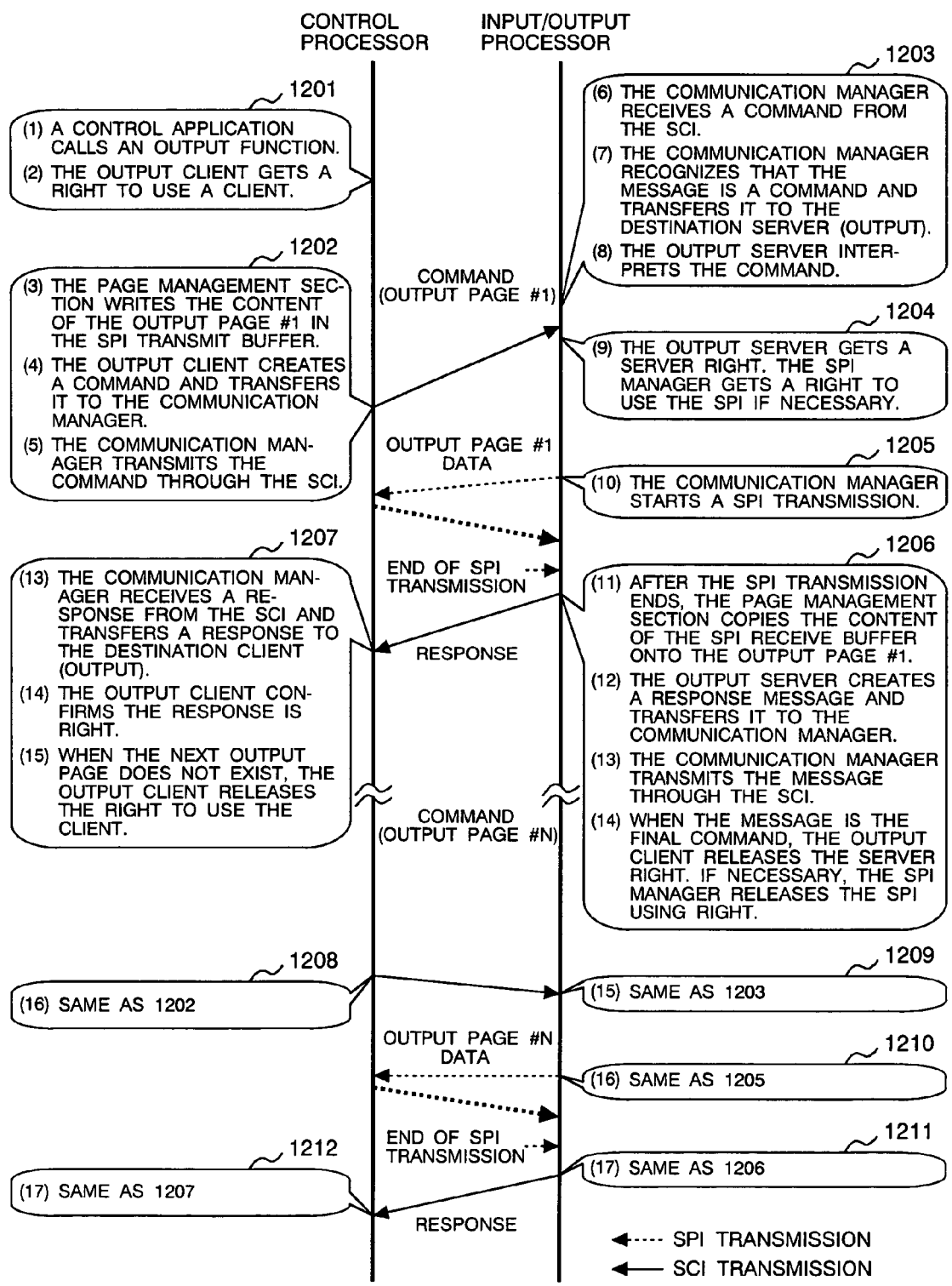
FIG. 8 is an explanatory drawing of output services of a multi-processor system which is an embodiment of the present invention.

(2) When any of the control programs 200A to 200M on the control processor 2 (for example, control program 200K) inputs data to an output device in the input/output processor 3, processing in FIG. 8 is implemented. Substantially, the processing is as follows:

The control program 200K writes data in a series of output pages 2D which are correspondent to the control program 200K and calls an output function (output_sync) of the interface program 221 with the page number of the top output page 2D as the first argument "top" and the number of output pages as the second argument "num." When only one output page is corresponding to the control program 200K, the input function (input_sync) is called with its output page number as the first argument "top" and the number of pages "1" as the second argument "num."

Then, the output client 222B called by the output function (output_sync) requests the communication manager 223 to register the service ID "1" of the output service which is requested for the output server 234B of the input/output processor 3 and gets a client-using right (Step 1201).

Then, the output client 222B requests the page management program 211 to transfer data to the SPI unit 24 from the output page 2D specified by the first argument "top" which is set at the startup time. In this case, the page management program 211 receives a source page number, the content of processing (read) on the source page, and a destination address (address of the transmit buffer 34B), reads data of the source page, and writes it in the storage area in the transmit buffer 24B pointed to by the destination address. When the data transfer to the transmit buffer 24B is complete, the output client 222B creates a reception request command message (RECV_OUT) having the first argument "top" and the end flag ("1" when "num" is 1 or "0" when "num" is not 1) which was transferred at the startup time, and transfers it to the communication manager 223. When the communication manager 223 requests the SCI driver 225 to transmit the reception request command message, the SCI driver transmits the reception request command message to the input/output processor 3 through the SCI cable 4. (Step 1202)

In the input/output processor 3, when receiving a message from the control processor 2, the SCI driver 325 transfers it to the communication manager 323. When making sure that the message is a command message, the communication manager 323 transfers the message to an output server 324B which is determined by the service ID set in the command message. The output server 324B interprets the command message and implements processing below according to the result of the interpretation. (Step 1203)

The output server 324B requests the communication manager 323 and the SPI manager 312 to register the service ID which is set in the command message and gets the server-using right and the SPI-using right. (Step 1204) Then the communication manager 323 requests the SPI driver 313 to start reception in response to an instruction from the output server 324B. With this, the data of the output page 2D of a specified page number set as an argument in the message command, that is the input data of the output device is transmitted to the input/output processor 3 through the SPI cable 5. (Step 1205)

When data transmission of one output page is complete and the input/output processor 3 generates an interrupt, the output server 324B requests the page management program 311 to transfer data from the SPI unit 34. The page management program 311 receives a page number (destination page number) set as an argument in the command message, the content of processing (write) on the destination page, and a source address (address of the source buffer 34A), reads data from a storage area in the receive buffer 34A pointed to by the destination address, and writes it in the destination page 3D. When data transfer from the receive buffer 34A is complete, the output server 324B creates a response message containing a response ID "7" and the result of operation "ACK", etc. When the communication manager 223 requests the SCI driver 325 to transmit the response message, the SCI driver 325 transmits the response message to the control processor 2 through the SCI cable 4.

The output server 324B checks whether the end flag value set as an argument in the command message is "1." The output server 324B causes the communication manager and the SPI manager to release the server-using right and the SPI-using right when the end flag value is "1" or waits for another request command message (RECV_OUT) to receive the next output page when the end flag value is not "1."

When the SCI driver 225 receives a message from the input/output processor 3, the control processor 2 transfers it to the communication manager 223. When the response ID in the message "7," the communication manager 223 transfers it as a response message to an output client 222B corresponding to the service ID "1" registered for the client-using right. When making sure that the response message contains ACK, that is, the SPI transmission ends normally, the output client checks whether all data of the pages specified by the second argument "num" which is transferred from the output function (output_sync) at the startup time has been transferred.

As the result, when all data specified by the second argument "num" is transferred, the output client 222B causes the communication manager 223 to release the client-using right. (1207) When transfer of all data specified by the second argument "num" is not complete, Steps 1208 to 1213 are implemented repetitively until all data specified by the second argument "num" is transferred.

The control processor 2 implements processing like Step 1202 according to the next page number and the end flag ("1" when the page is the final page or "0" when the page is not the final page) as the arguments. With this, the receive request command message (RECV_OUT) is transmitted to the input/output processor 3. (Step 1208)

The input/output processor 3 implements processing like Step 1203 according to the receive request command message (Step 1209) and further processing like Steps 1205 and 1206 (Steps 1210 and 1211). With this, data is transferred from the output page 2D of the specified page number set as an argument in the receive request command message to the output page 3D of the same page number and a response message is transmitted to the control processor 2 through the SCI cable 4.

When receiving the response message from the input/output processor 3, the control processor 2 implements processing like Step 1211 (Step 1212).

With these steps, the input/output processor 3 writes data in output pages 3D of the number of pages specified by the second argument "num" set in the output function (output_sync) by the control program 200K starting at an output page 3D of the page number pointed by the first argument "top" set in the output function (output_sync) by the control program 200K. With this, the input/output driver 350 can get data given to the output device corresponding to the output pages 3D by reading the data of these output pages 3D.

Figure 9:
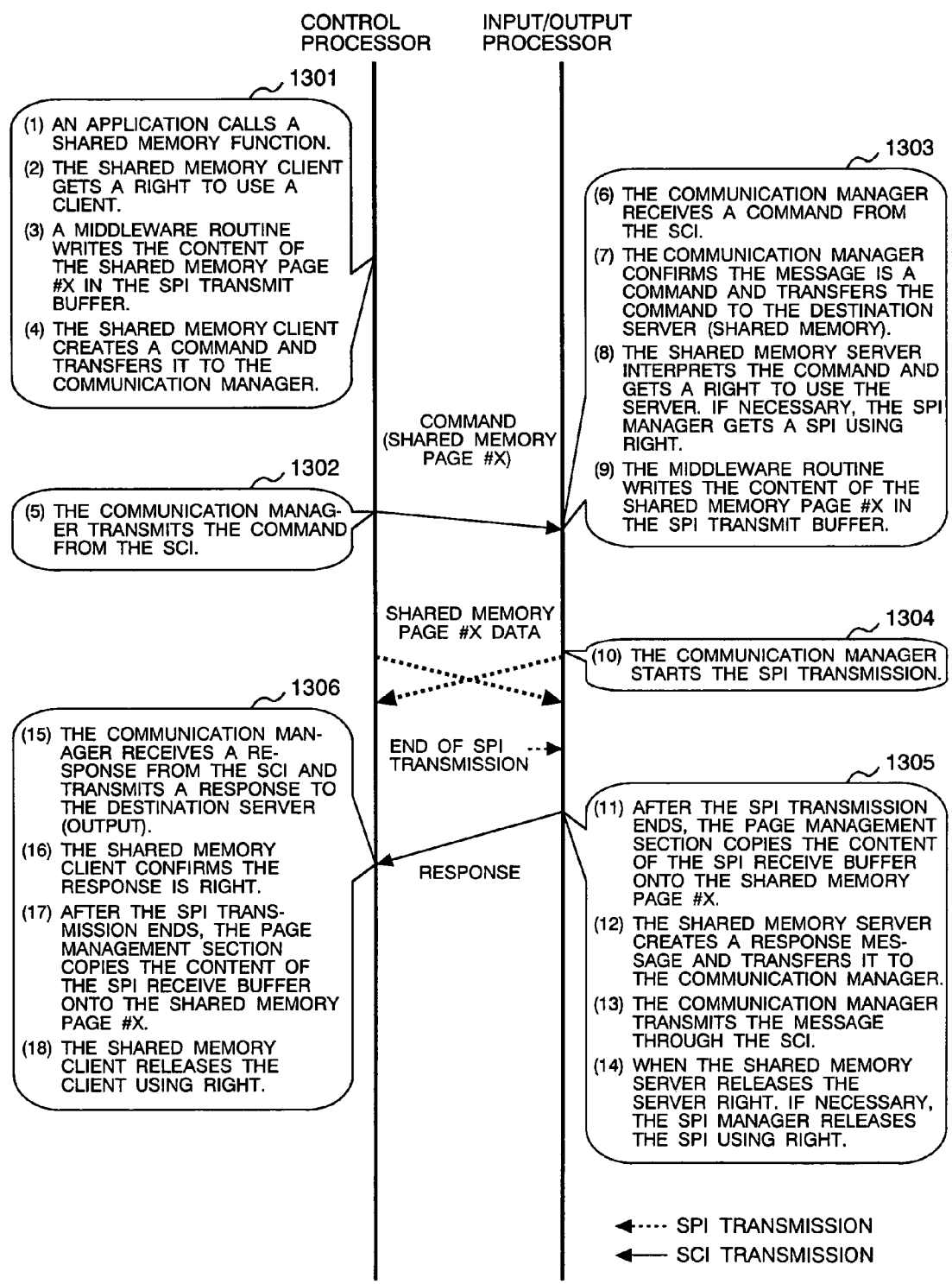
FIG. 9 is an explanatory drawing of shared memory services of a multi-processor system which is an embodiment of the present invention.

(3) When any of the control program 200A to 200M (for example, control program 200K here) in the control processor 2 requests an application program 300K in the input/output processor 3 to exchange data, processing shown in FIG. 9 is implemented. Substantially, the processing is as follows:

The control program 200K first writes data in the write-only page 2B corresponding to the application program 300K and calls a read write function (read_write_sync) of the interface program with the page number of a write-only page 2B corresponding to the application program 300K as the first argument "r_page" and the read-only page 2A as the second argument "w_page."

Then, the shared memory client 222A called by the read write function (read_write_sync) requests the communication manager 223 to register the service ID "2" of the shared memory service which is requested for the shared memory server 324A of the input/output processor 3 and gets the right to use the client.

Figure 3:
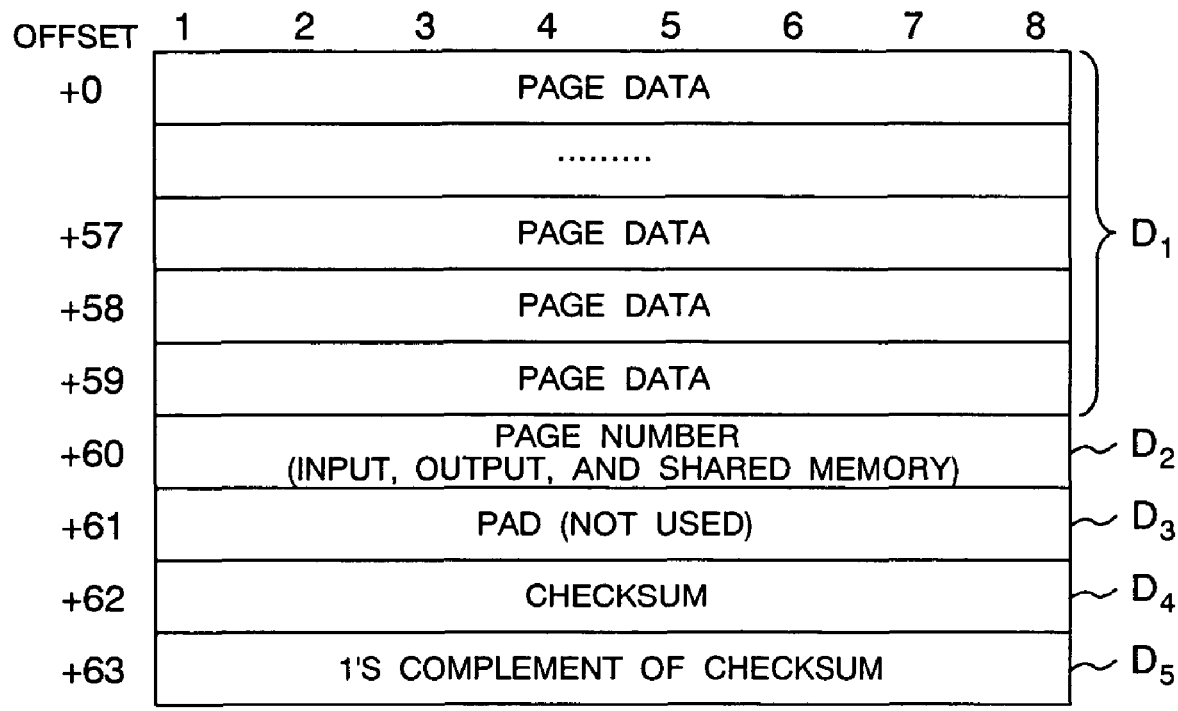
FIG. 3 shows a conceptual format of SPI transmission data.

Then, the shared memory client 222A requests the page management program 211 to transfer data from the write-only page 2B specified by the second argument "w_page" which is transferred at the start-up time to the SPI unit 24. In this case, the page management program 211 receives the page number "w_page" of the source page, the content of processing on the write-only page, and a destination address (address of the transmit buffer 24B), reads data of the destination page, transfers the data to the storage area in the transmit buffer 24B pointed to by the destination address, and writes the page number "w_page" of the source page in the $61^{st}$ byte ($D_2$ in FIG. 3) of the transmit buffer. When data transfer to the transmit buffer 24B is complete, the shared memory client 222A creates a transmission/reception request command message (sync_page) having, as its argument, the first argument "r_page" which was set at the startup time, and transfers it to the communication manager 223 (Step 1301). When the communication manager 223 requests the SCI driver 225 to transmit the transmission/reception request command message, the SCI driver 225 transmits the command message to the input/output processor 3 through the SCI cable 4 (Step 1302).

In the input/output processor 3, when receiving the message from the control processor 2, the SCI driver 325 transfers it to the communication manager 323. When making sure that the message is a command message, the communication manager 323 transfers the command message to a shared memory server 324A which is determined by the service ID set in the command message. The shared memory server 324A interprets the command message and implements processing below according to the result of interpretation.

The shared memory server 324A requests the communication manager 323 and the SPI manager 312 to register the service ID "2" which is in the command message and gets the server-using right and the SPI using right. Further, the shared memory server 324A requests the page management program 311 to transfer data from a write-only page 3A specified by the argument "r_page" which is set at the start-up time to the SPI unit 34. The page management program 311 receives a source page number "r_page," the content of processing (read) on the source page, and an address of the transmit buffer 34B (destination address), reads data of the source page, and writes it in the storage area in the transmit buffer 34B pointed to by the destination address. (Step 1303)

When data transfer to the transmit buffer 34B is complete, the communication manager 323 orders the SPI driver 313 to start transmission/reception according to the instruction from the shared memory server 324A. With this, the output of the control program 200K in the control processor 2 is transmitted to the input/output processor 3 through the SPI cable 5 and the output of the application program 300K in the input/output processor 3 is transmitted to the control processor 2 through the SPI cable 5. (Step 1304)

When data exchange of the shared memory pages is complete and the input/output processor 3 generates an interrupt, the shared memory server 324A reads data of the $61^{st}$ byte in the receive buffer 34A and requests the page management program 311 to transfer data to the read-only page 3B of the page number set in the data. The page management program 311 receives a destination page number (data of the $61^{st}$ byte), the content of processing (write) on the destination page, and a source address (address of the receive buffer 34A), reads data from a storage area in the receive buffer 34A pointed to by the source address and writes it in the destination page 3B. When data transfer to the destination page is complete, the shared memory server 324A creates a response message containing the response ID "7" and the result of operation "ACK" and transfers it to the communication manager 323. When the communication manager 223 requests the SCI driver 325 to transmit the response message, the SCI driver 325 transmits the response message to the control processor 2 through the SCI cable 4. Further, the shared memory server 324A causes the communication manager and the SPI manager to release the server-using right and the SPI-using right. (Step 1305)

In the control processor 2, when receiving the message from the input/output processor 3, the SCI driver 225 transfers it to the communication manager 223. When the message contains a response ID "7," the communication manager 223 transfers it as a response message to the shared memory client 222 for a service ID which is registered for a client-using right. When making sure that the response message contains ACK, that is, the SPI transmission is normally complete, the shared memory client 222A requests the page management program 211 to transfer data to the read-only page 2A specified by the first argument "r_page" which is set at the startup time. The page management program 211 receives a destination page number "r_page," the content of processing (write) on the destination page, and an address of the receive buffer 24A (source address), reads data from the storage area in the receive buffer 24A pointed to by the source address, and writes it in the destination page 2A. When data transfer to the destination page is complete, the shared memory client 222A causes the communication manager 223 to release the client-using right (Step 1306).

With the above processing, data is transferred from the write-only page 3A in the input/output processor 3 to the read-only page 2A in the control processor 2 with their page numbers matched. As the result, the control program in the control processor 2 can get the output of a corresponding application program in the input/output processor 3 by reading the data of the read-only pages 2A. At the same time, data is transferred from write-only pages 2B in the control processor 2 to read-only pages 3B in the input/output processor 3. Consequently, the application program in the input/output processor 3 can get the output of a corresponding control program in the control processor 2 by reading the data of the read-only pages 3B. The above processing can enable the control programs in the control processor 2 to collaborate with application programs in the input/output processor 3.

Figure 10:
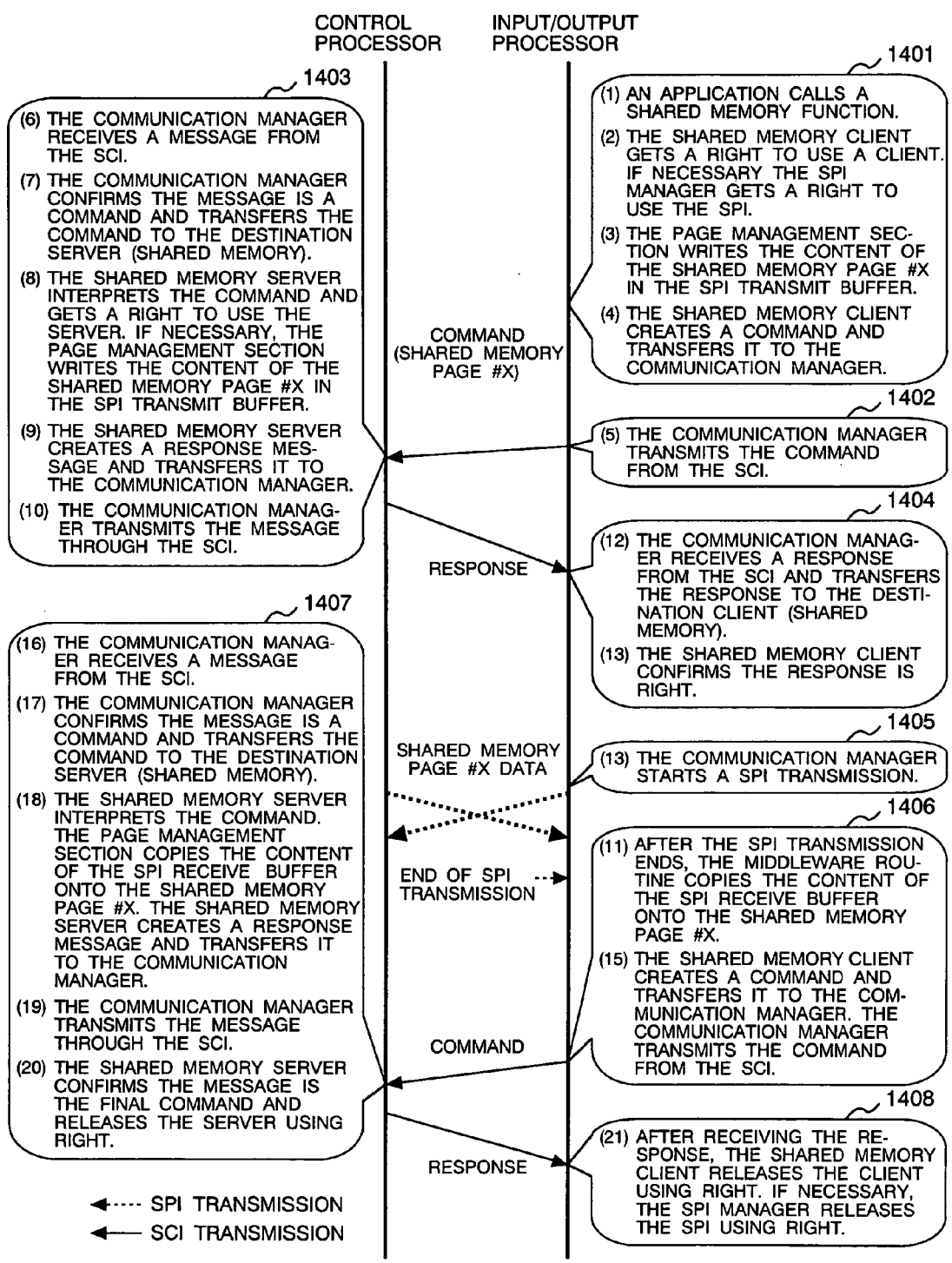
FIG. 10 is an explanatory drawing of shared memory services of a multi-processor system which is an embodiment of the present invention (continued from FIG. 9).
Figure 11:
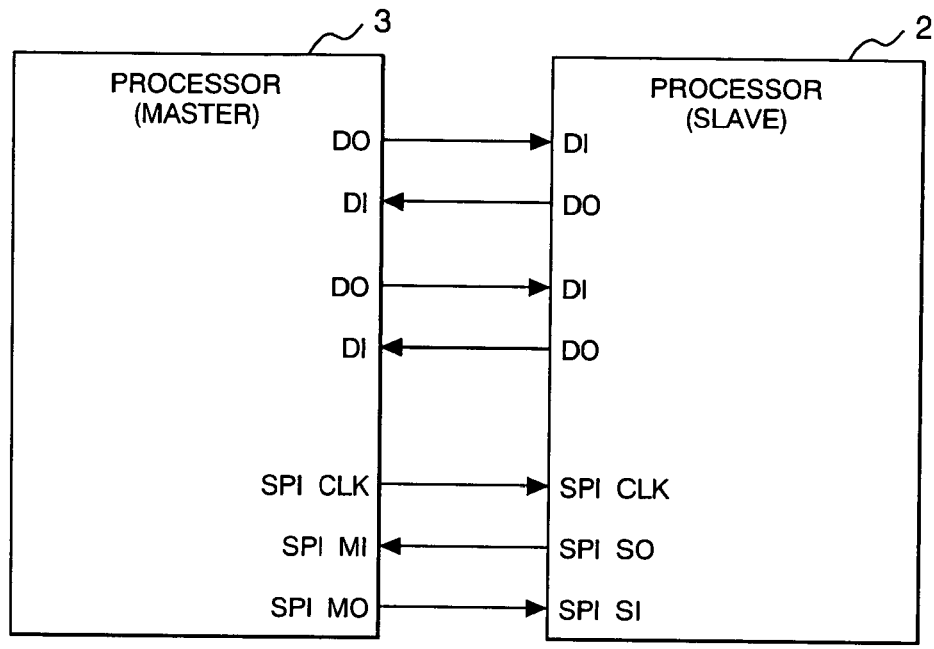
FIG. 11 is an outlined hardware configuration of a multi-processor system which is an embodiment of the present invention.

(4) When any of the application programs 300A to 300M (for example, application program 300K here) in the input/output processor 3 requests a control program 200K in the control processor 2 to exchange data, processing shown in FIG. 10 is implemented. Substantially, the processing is as follows:

The application program 300K first writes data in the write-only page 3A corresponding to the control program 200K and calls a read write function (read_write_sync) of the interface program 321 with the page number of a write-only page 3A corresponding to the control program 200K as the first argument "r_page" and the read-only page 3B as the second argument "w_page." Then, the shared memory client 322 called by the read write function (read_write_sync) requests the communication manager 323 and the SPI manager 312 to register the service ID "2" of the shared memory service which is requested for the shared memory server 224 of the control processor 2 and gets the client-using right and the SPI-using right.

Then, the shared memory client 322 requests the page management program 311 to transfer data from the write-only page 3A specified by the second argument "w_page" which is transferred at the start-up time to the SPI unit 34. In this case, the page management program 311 receives the page number "w_page" of the source page, the content of processing on the source page (read), and a destination address (address of the transmit buffer 34B), reads data of the source page, transfers the data to the storage area in the transmit buffer 34B pointed to by the destination address, and writes the page number "w_page" of the source page in the $61^{st}$ byte ($D_2$ in FIG. 3) of the transmit buffer. When data transfer to the transmit buffer 34B is complete, the shared memory client 322 creates a transmission/reception request command message (sync_page) having, as its argument, the first argument "r_page" which was set at the startup time, and transfers it to the communication manager 223 (Step 1401).

When the communication manager 323 requests the SCI driver 325 to transmit the transmission/reception request command message, the SCI driver 325 transmits the command message to the control processor 2 through the SCI cable 4 (Step 1402).

In the control processor 2, when receiving the message from the input/output processor 3, the SCI driver 225 transfers it to the communication manager 223. When making sure that the message is a command message, the communication manager 223 transfers the command message to a shared memory server 224 which is determined by the service ID set in the command message. The shared memory server 224 interprets the command message and implements processing below according to the result of interpretation.

The shared memory server 224 requests the communication manager 323 and the SPI manager 312 to register the service ID "2" which is in the command message and gets the server-using right and the SPI using right, and then the shared memory server 224 requests the page management program 211 to transfer data from a write-only page 2B specified by the argument "r_page" which is set at the start-up time to the SPI unit 24. The page management program 211 receives a source page number "r_page," the content of processing (read) on the source page, and a destination address (an address of the transmit buffer 24B), reads data of the source page, and writes it in the storage area in the transmit buffer 24B pointed to by the destination address. When the data transfer to the transmit buffer 24B is complete, the shared memory server 224 creates a response message containing a response ID "7" and the result of operation "ACK" and transfers it to the communication manager 223. When the communication manager 223 requests the SCI driver 225 to transmit the response message, the SCI driver 225 transmits the response message to the input/output processor 3 through the SCI cable (Step 1403).

In the input/output processor 3, when receiving the message from the control processor 2, the SCI driver 325 transfers it to the communication manager 323. When the message contains a response ID "7," the communication manager 323 transfers it as a response message to the shared memory client 322 for a service ID which is registered for a client-using right. When the shared memory client 322 makes sure that the response message contains ACK, that is, the data transfer to the SPI unit is complete in the control processor 2 (Step 1404), the communication manager 323 orders the SPI driver 313 to start transmission/reception in response to a command from the shared memory client 322. This transmits data of the write-only pages 3A in the input/output processor 3 (or the output of the application program in the input/output processor 3) to the control processor 2 through the SPI cable and data of the write-only pages 2B in the control processor 2 (or the output of the control program 200K in the control processor 2) to the input/output processor 3 through the SPI cable 5. (Step 1405)

When data exchange of the shared memory pages is complete and the input/output processor generates an interrupt, the shared memory client 322 requests the page management program 311 to transfer data to a read-only page 3B of a page number specified by the first argument "r_page" which is set at the startup time. The page management program 311 receives a destination page number "r_page" the content of processing (write) on the destination page, and a source address (address of the receive buffer 34A in the SPI unit). Then the page management program 311 reads data from a storage area in the receive buffer 34A pointed to by the source address, and writes the data in the destination page 3B.

When data transfer to the destination page is complete, the shared memory server 324A creates a read request command message (READ_PAGE) and transfers it to the communication manager 223. When the communication manager 223 requests the SCI driver 325 to transmit the read request command message, the SCI driver 325 transmits the read request command message to the control processor 2 through the SCI cable 4. (Step 1406)

In the control processor 2, when receiving a message from the input/output processor 3, the SCI driver 225 transfers it to the communication manager 223. When making sure that the message is a command message, the communication manager 223 transfers the command message to the shared memory server 224 which is determined by the service ID set in the command message. The shared memory server 224 interprets the command message and requests the page management program 211 to transfer data to the read-only page 2A specified by data "w_page" of the $61^{st}$ byte of the receive buffer 24A. In this case, the page management program 211 receives a destination page number (data of the $61^{st}$ byte), the content of processing (write) on the destination page, and a source address (address of the receive buffer 34A).

Then the page management program 211 reads data from a storage area in the receive buffer 24A pointed to by the source address and writes it in the destination page 2A. When data transfer from the receive buffer 24A is complete, the shared memory server 224 creates a response message containing a response ID "7" and the result of operation "ACK" and transfers it to the communication manager 223. When the communication manager 223 requests the SCI driver 225 to transmit the response message, the SCI driver 225 transmits the response message to the input/output processor 3 through the SCI cable 4. The shared memory server 224 causes the communication manager 223 to release the server-using right. (Step 1407)

In the input/output processor 3, when receiving a message from the control processor 2, the SCI driver 325 transfers it to the communication manager 323. When the message contains a response ID "7," the communication manager 323 transfers it as a response message to the shared memory client 322 for the service ID registered for the client-using right. When the shared memory client 322 makes sure that the response message contains ACK or that the data exchange to and from the control processor 2 is complete, the communication manager 323 and the SPI manager release the right to use the memory client and the right to use the SPI in response to a command from the shared memory client 322. (Step 1408)

With the above processing, data is transferred from the write-only page 2B in the control processor 2 to the read-only page 3B in the input/output processor 3 with their page numbers matched. As the result, the application program in the input/output processor can get the output of a corresponding control program in the control processor 2 by reading the data of the read-only pages 3B. At the same time, data is transferred from write-only pages 3A in the input/output processor 3 to read-only pages 2A in the control processor 2. Consequently, the control program in the control processor 2 can get the output of a corresponding application program in the input/output processor 3 by reading the data of the read-only pages 2A.

The above processing can enable the control programs in the control processor 2 to collaborate with application programs in the input/output processor 3.

This embodiment is designed to implement data transfer from write-only pages in the input processor to read-only pages in the control processor and data transfer from write-only pages in the control processor to read-only pages in the input processor in response to one request from the control program. However, it is possible to implement data transfer in response to individual requests from control programs at individual time points.

As already described above, the software configuration in accordance with this embodiment enables bi-directional data transfer between two processors by using their SPI units as if they are a kind of multi-master type communication interface. Therefore, this embodiment can accomplish a processor-to-processor communication which is faster than a processor-to-processor communication using SCI only. Thanks to this faster processor-to-processor communication, the multi-processor system can leave data transfer to and from external devices to a dedicated processor and process more control items and sensors. Judging from the above, this embodiment can increase the processing ability of a multi-processor system.

Further, unlike a bus-coupled type multi-processor system in which processors share an external bus, this embodiment does not require any external arbitration circuit for processor-to-processor communication and can build an inexpensive multi-processor system.

Although this embodiment is designed to implement data transfer from input pages in the input processor to input pages in the control processor (processing by "input_sync") and data transfer from output pages in the control processor to output pages in the input processor (processing by "output_sync") in response to individual requests from control programs at individual time points, it is possible to implement both of these data transfers in response to one request from a control program. This can be accomplished for example by an input/output client instead of an input client 222C and an output client 222B in the control processor, causing the input/output client to copy data of an input page specified by the control program onto the transmit buffer when a function is made to call the input/output client, and transmitting a command message having the output page number specified by the control program as the argument. At the same time, it can be accomplished by pre-installing an input/output server instead of the input server 324C and the output sever 324B in the input/output processor 3, copying data of an output page specified by a command message to the transmit buffer when the input/output server receives the command message from the input/output client, and ordering the communication manager 323 to start SPI transmission. Further, it can be accomplished by causing the input/output processor to transfer data from the SPI unit to the output page and the control processor to transfer data from the SPI unit to the input page when data exchange by the SPI transmission is complete. These means can reduce a time period required to get data from input devices and transmit data to output devices down to approximately half as much as the time period by data transfer from input pages in the input processor to input pages in the control processor and data transfer from output pages in the control processor to output pages in the input processor.

Further, although this embodiment uses the SPI unit in the control processor as a slave SPI unit and the SPI unit in the input/output processor as a master SPI unit, it is possible to use the SPI unit in the control processor as a master SPI unit and the SPI unit in the input/output processor as a slave SPI unit. In this case, it is necessary to place the SPI manager in the control processor and change the timing to start SPI transmission in input and output services as described below.

In an input service, for example, the input server in the input/output processor returns a response message just after copying input pages onto the transmit buffer in response to the XMIT_IN command message sent from the control processor. The input client in the control processor starts an SPI transmission in response to a response message from the input/output processor and transfers data from the receive buffer to input pages after the SPI transmission is complete.

In an output service, for example, the output client in the control processor starts an SPI transmission before the RECV_OUT command message is transmitted and the output server in the input/output processor transfers data from the receive buffer to output pages in response to the RECV_OUT command message from the control processor.

Furthermore, this embodiment uses one SCI cable and one SPI cable to connect two processors. However, it is to be understood that the invention is not intended to be limited to this combination of cables. For example, a plurality of SPI cables can be used to connect two processors so that a plurality of services may be provided by means of respective SPI cables. Similarly, a plurality of SCI cables can be used to connect two processors.

Figure 12:
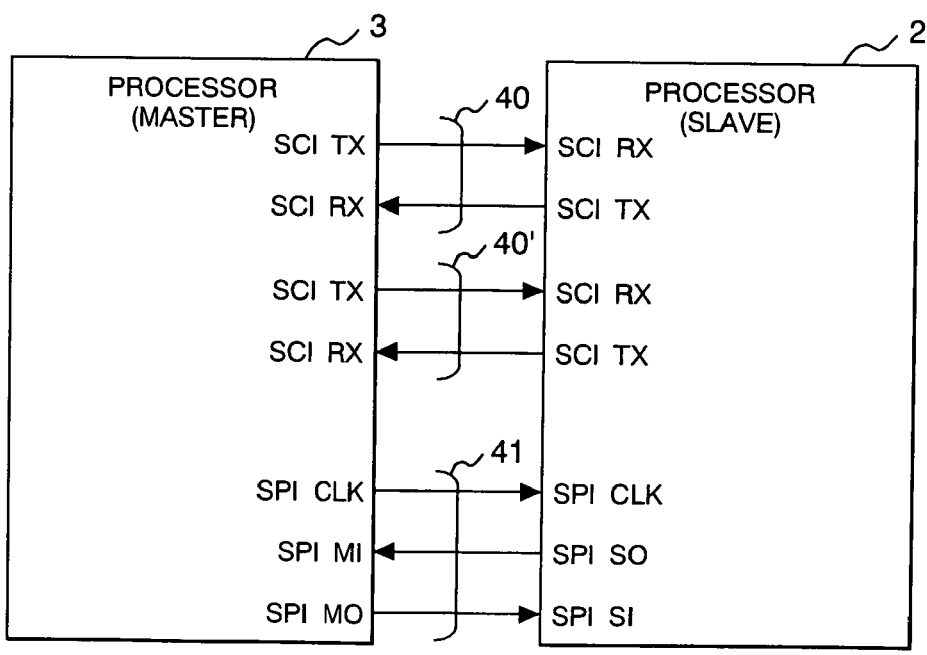
FIG. 12 is an outlined hardware configuration of a multi-processor system which is an embodiment of the present invention.

FIG. 12 shows a connection example of the multi-processor system in which two processors are connected with two SCI cables 4 and 4' and one SPI cable 5. When receiving a message, the SCI driver may return ACK or NAK by a SCI command field (71 in FIG. 5) for confirmation of completion of transmission of the message. If the message is garbled on the SCI cable, it is impossible to judge whether the message is a processor message (command or response) or an SCI driver confirmation message (ACK or NAK).

Contrarily, when two SCI cables are used to connect the two processors 2 and 3, one SCI cable 4 can be assigned to transmit a message of the control processor and receive its confirmation message. The other SCI cable 4' can be assigned to transmit a message of the input/output processor and receive its confirmation message. Therefore, even when a command message is garbled on one of the SCI cables, it is possible to immediately judge, isolate and repair the error (SCI driver error, communication server error, or communication client error).

Further, although this embodiment uses SPI, it can be substituted for the other single-master type serial communication interface or multi-master type serial communication interface.

Furthermore, although this embodiment uses SCI, it can be substituted by the other multi-master type bi-directional serial communication interface or parallel communication interface. For example, when IEEE1394 is used as interface, messages are set in IEEE1394 data packets for transmission and reception. When DI and DO are used as shown in FIG. 14, a command is assigned to one or more DI signal lines and one byte argument data is assigned to each of eight DI signal lines and eight DO signal lines.

In the above description, a functional distributed system is accomplished by a multi-processor system. As already described, it is also possible to accomplish a load balancing system by a multi-processor system having a similar hardware configuration. When accomplishing a load balancing system, you should distribute jobs to two processors so that two processors may have loads approximately evenly.

Although a controller for automobile is described as an example, the multi-processor system of this embodiment is also applicable to factory automation.

EFFECTS OF THE INVENTION

This invention can increase the processing ability of a multi-processor system.

What is claimed is:

1. A multi-processor system comprising:
a slave processor;
a first transmission path connected to said slave processor;
a master processor connected to said first transmission path through which said master processor starts to communicate with said slave processor; and
a second transmission path which connects said slave processor and said master processor,
wherein the transmission speed of said second transmission path is less than the transmission speed of said first transmission path, and
wherein said slave processor is equipped with a command transmission means for sending a transmission request command which requests either data transmission or data reception to said master processor via said second transmission path; and
said master processor is equipped with a data transmission means for starting data transmission to said slave processor via said first transmission path in response to said transmission request command.

2. A multi-processor system comprising:
a slave processor, which is defined as a slave relative to a master processor, the slave processor having a first single master type bi-directional communication interface unit and a first multi-master type bi-directional communication interface unit,
wherein the transmission speed of said first multi-master type bi-directional communication interface unit is less than the transmission speed of said first single master type bi-directional communication interface unit;
a master processor, which is defined as a master to start communication with said slave, the master processor having a second single master type bi-directional communication interface unit and a second multi-master type bi-directional communication interface unit, wherein the transmission speed of said second multi-master type bi-directional communication interface unit is less than the transmission speed of said second single master type bi-directional communication interface unit;

a first transmission cable for connecting said first single master type bi-directional communication interface unit and said second single master type bi-directional communication interface unit; and a second communication cable for connecting said first multi-master type bi-directional communication interface unit and said second multi-master type bi-directional communication interface unit, wherein said slave processor is equipped with a first command transmission means for transmitting a transmission request command to request said master processor to start transmission of data from said first multi-master type bi-directional communication interface unit to said master processor via said second communication cable, and wherein said master processor causes said second single master type bi-directional communication interface unit to start communication with said first single master bi-directional communication interface unit in response to said transmission request command, which was received by said second multi-master type bi-directional communication interface unit, and sends said data to said slave processor via said first communication cable.

3. The multi-processor system of claim 2, wherein said first single master type bi-directional communication interface unit and said second single master type bi-directional communication interface unit are SPI (Serial Peripheral Interface) units.

4. The multi-processor system of claim 2, wherein said first multi-master type bi-directional communication interface unit and said second multi-master type bi-directional communication interface unit are either SCI (Serial Communication Interface) units or IEEE1394 interface units.

5. The multi-processor system of claim 2, wherein said master processor includes a data communication means and an input means, wherein said input means connects to an input device and receives output data from said input device, wherein said slave processor includes a program, which processes said output data received from said input device, wherein said first command transmission means sends a first transmission request command which requests transmission of said output data received from said input device to said master processor via said first multi-master type bi-directional communication interface unit in response to a request from said program, and wherein said data communication means causes said second single master type bi-directional communication interface unit to start reception of said output data received from said input device in response to said first transmission request command when said second multi-master type bi-directional communication interface unit receives said first transmission request command.

6. The multi-processor system of claim 5, wherein said master processor is equipped with a storage means which corresponds to said input device and stores a first input page to include said output data received from said input device, wherein said slave processor is equipped with a storage means which contains a second input page which corresponds to said first input page, wherein said first command transmission means sends said first transmission request command which contains a specification of said first input page, and wherein said data communication means causes said second single master type bi-directional communication interface unit to start to receiving data from said first input page and to store said data received from said first input page in said second input page.

7. The multi-processor system of claim 2, wherein said master processor includes a data communication means and an output means, wherein said output means connects to an output device and sends input data to said output device, wherein said slave processor contains a program to calculate said input data, wherein said first command transmission means transmits a second transmission request command which requests reception of said input data in response to a request from said program to said master processor via said first multi-master type bi-directional communication interface unit, and wherein said data communication means causes said second single master type bi-directional communication interface unit to start data transmission to said output device in response to said second transmission request command when said second multi-master type bi-directional communication receives said second transmission request command.

8. The multi-processor system of claim 7, wherein said slave processor has a storage means related to said output device and contains a first output page in which the input data of said output device is stored by said program, wherein said first command transmission means transmits said second transmission request command which contains a specification of said first output page, wherein said data communication means causes said second single master type bi-directional communication interface unit to start transmission of said input data which is stored in said first output page indicated by the specification in said second transmission request command, and wherein said master processor comprises a storage means which contains a second output page corresponding to said first output page and a data communication means which stores, in said second output page, data which said second single master type bi-directional communication interface unit transmitted in response to said second transmission request command.

9. The multi-processor system of claim 2, wherein said master processor contains a first program, wherein said slave processor contains a second program which cooperates with said first program, said first command transmission means transmits a first transmission request command which requests to transmit output data of said first program and a second transmission request command which requests to receive output data of said second program in response to a request from said second program to said master processor via said master processor, and wherein said data communication means causes said second single master type bi-directional communication interface unit to start transmission of output data of said first program to said second multi-master type bi-directional communication interface unit in response to said first transmission request command when said second multi-master type bi-directional communication interface unit receives said first transmission request command and causes said second multi-master type bi-directional communication interface unit to start reception of the output data of said second program to said first single master type bi-directional communication interface unit in response to said second transmission request command when said second multi-master type bi-directional communication interface unit receives said second transmission request command.

10. The multi-processor system of claim 2,
wherein a third communication cable is provided to connect said first multi-master type bi-directional communication interface unit and said second multi-master type bi-directional communication interface unit,
wherein said master processor is equipped with a second command transmission means which transmits a command to said slave processor from said second multi-master type bi-directional communication interface unit via said third communication cable,
wherein this second command transmission means transmits a confirmation message to said slave processor via said second communication cable from said second multi-master type bi-directional communication interface unit when said second multi-master type bi-directional communication interface unit receives said transmission request command via said second communication cable, and
wherein said first command transmission means transmits a confirmation message to said master processor via said third communication cable when said second multi-master type bi-directional communication interface unit receives said transmission command via said third communication cable.

11. The multi-processor system of claim 2, wherein said first multi-master type bi-directional communication interface unit is provided inside or outside of said slave processor and said second multi-master type bi-directional communication interface unit is provided inside or outside of said master processor.

* * * * *